United States Patent
Matsunaga et al.

(10) Patent No.: US 9,896,994 B2
(45) Date of Patent: Feb. 20, 2018

(54) CONTROL APPARATUS OF ENGINE

(71) Applicant: MITSUBISHI JIDOSHA KOGYO KABUSHIKI KAISHA, Tokyo (JP)

(72) Inventors: Ayatoshi Matsunaga, Aichi (JP); Yasuo Yamaguchi, Aichi (JP); Shinichi Murata, Aichi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 14/965,366

(22) Filed: Dec. 10, 2015

(65) Prior Publication Data
US 2016/0097319 A1 Apr. 7, 2016

Related U.S. Application Data

(63) Continuation of application No. PCT/JP2014/065706, filed on Jun. 13, 2014.

(30) Foreign Application Priority Data

Jun. 14, 2013 (JP) .................. 2013-126071

(51) Int. Cl.
F02D 23/00 (2006.01)
F02B 33/44 (2006.01)
F02B 37/18 (2006.01)
F02B 37/16 (2006.01)
F02D 41/06 (2006.01)
(Continued)

(52) U.S. Cl.
CPC ............ F02B 37/186 (2013.01); F02B 37/16 (2013.01); F02B 37/18 (2013.01); F02B 39/10 (2013.01); F02D 23/00 (2013.01); F02D 35/025 (2013.01); F02D 41/0007 (2013.01); F02D 41/0255 (2013.01); F02D 41/064 (2013.01);
(Continued)

(58) Field of Classification Search
CPC ........ F02B 37/186; F02B 37/16; F02B 37/18; F02B 39/10; F02D 41/0007; F02D 35/0255; F02D 41/064; F01N 3/101; Y02T 10/144; Y02T 10/22; Y02T 10/26
USPC ................. 60/602, 605.1, 611; 701/102–104
See application file for complete search history.

(56) References Cited

U.S. PATENT DOCUMENTS 4,387,571 A * 6/1983 Katsumata .......... F02D 41/0007
60/602
4,404,804 A * 9/1983 Tadokoro ................ F02B 37/18
60/602
(Continued)

FOREIGN PATENT DOCUMENTS

JP 61275525 A * 12/1986
JP 62-174536 A 7/1987
(Continued)

OTHER PUBLICATIONS

Office Action dated Oct. 19, 2016 in corresponding JP Application No, 2013-126071 with an English Translation.

Primary Examiner — Thai Ba Trieu
(74) Attorney, Agent, or Firm — Birch, Stewart, Kolasch & Birch, LLP

(57) ABSTRACT

Upon request for start-up of an engine, a control apparatus controls the opening/closing action of a waste gate valve in accordance with the temperature Te of the engine before cranking and, if the temperature Te of the engine is equal to or lower than a first set temperature Te1, sets the waste gate valve in an open state.

7 Claims, 4 Drawing Sheets

(51) Int. Cl.
  *F02D 41/00* (2006.01)
  *F02D 41/02* (2006.01)
  *F02B 39/10* (2006.01)
  *F02D 35/02* (2006.01)
  *F01N 3/10* (2006.01)

(52) U.S. Cl.
  CPC .............. *F01N 3/101* (2013.01); *Y02T 10/144* (2013.01); *Y02T 10/22* (2013.01); *Y02T 10/26* (2013.01)

(56) References Cited

U.S. PATENT DOCUMENTS

| | | | |
|---|---|---|---|
| 5,996,347 A | 12/1999 | Nagae et al. | |
| 8,001,778 B2* | 8/2011 | Sun | F02D 41/0007 60/611 |
| 8,001,782 B2* | 8/2011 | Pursifull | F02D 41/0007 60/602 |
| 8,201,406 B2* | 6/2012 | Kogo | F02D 41/0007 60/602 |
| 8,301,358 B2* | 10/2012 | Kurtz | F02D 41/064 701/105 |
| 8,375,714 B2* | 2/2013 | Gokhale | F02B 37/18 60/602 |
| 8,397,499 B2* | 3/2013 | Doering | F02D 41/0007 60/602 |
| 8,468,821 B2* | 6/2013 | Liu | F02D 41/0007 60/602 |
| 9,010,114 B2* | 4/2015 | Krug | F02B 37/18 60/611 |
| 2003/0126860 A1* | 7/2003 | Uraki | F02B 37/16 60/602 |
| 2009/0107142 A1* | 4/2009 | Russell | F02B 33/40 60/608 |
| 2011/0225968 A1* | 9/2011 | Eiraku | F02B 37/186 60/602 |
| 2013/0006494 A1* | 1/2013 | Petrovic | F02D 41/0007 701/102 |
| 2013/0098032 A1 | 4/2013 | Wade et al. | |
| 2014/0041380 A1* | 2/2014 | Byrd | F02B 37/18 60/602 |
| 2014/0325983 A1* | 11/2014 | Tsunooka | F02D 41/0007 60/602 |
| 2016/0108827 A1* | 4/2016 | Matsunaga | F02D 41/0007 60/603 |

FOREIGN PATENT DOCUMENTS

| | | |
|---|---|---|
| JP | 62-200142 U | 12/1987 |
| JP | 4-301137 A | 10/1992 |
| JP | 09109665 A * | 4/1997 |
| JP | 10-47070 A | 2/1998 |
| JP | 2007-100607 A | 4/2007 |
| JP | 2007-285222 A | 11/2007 |
| JP | 2008-95542 A | 4/2008 |
| JP | 2008-180176 A | 8/2008 |
| JP | 2010-230044 A | 10/2010 |
| JP | 2012-97714 A | 5/2012 |
| JP | 2012-219634 A | 11/2012 |
| JP | 2015129457 A * | 7/2015 |
| WO | WO 2006/123836 A1 | 11/2006 |

* cited by examiner

CONTROL APPARATUS OF ENGINE

CROSS REFERENCE TO RELATED APPLICATIONS

This application is a Continuation of PCT International Application No. PCT/JP2014/065706, filed on Jun. 13, 2014, which claims priority under 35 U.S.C. 119(a) to Patent Application No. 2013-126071, filed in Japan on Jun. 14, 2013, all of which are hereby expressly incorporated by reference into the present application.

TECHNICAL FIELD

This invention relates to a control apparatus of an engine equipped with a waste gate valve for adjusting a boost pressure by a supercharger such as a turbocharger.

BACKGROUND ART

Among conventional engines equipped with a supercharger, such as a turbocharger, have been those provided with an exhaust bypass passage for bypassing a turbine of the supercharger. In the exhaust bypass passage, a waste gate valve for opening and closing the exhaust bypass passage is provided. Upon opening/closing of the waste gate valve, an excessive rise in the boost pressure is suppressed to ensure stability of the boost pressure and inhibit damage to the engine or the supercharger itself.

In recent years, it has been common practice to actively control the opening/closing action of the waste gate valve in accordance with the operating state of the engine. There has been, for example, a controller of the type which detects an ambient temperature and controls the opening of the waste gate valve in accordance with the detected ambient temperature, thereby preventing the occurrence of malfunction due to a change in the temperature of an intake system (see Patent Document 1).

PRIOR ART DOCUMENTS

Patent Documents

Patent Document 1: JP-A-2012-97714

SUMMARY OF THE INVENTION

Problems to Be Solved by the Invention

Start-up of an engine (internal combustion engine) loaded on a vehicle, such as an automobile, is performed by cranking the engine, for example, in response to a start-up request by the operation of a starting switch such as an ignition switch. To enhance the startability of the engine, it is effective to increase the engine speed by cranking. For example, even under an environment where the startability of the engine is poor, as in extremely cold starting, the startability of the engine can be improved by increasing the engine speed by cranking. In accordance with an improvement in the startability, moreover, an engine body, a catalyst, and an air-fuel ratio sensor can be warmed up early, and a stable operation after starting and exhaust gas amelioration can also be realized.

With the conventional engine equipped with a supercharger, however, even when it is attempted to increase the engine speed by cranking, the turbine of the supercharger offers a resistance, making it impossible to increase the engine speed sufficiently.

The present invention has been accomplished in the light of the above circumstances. It is an object of the invention to provide a control apparatus of an engine which, for example, can enhance the startability of the engine even in extremely cold starting, can also achieve a stable operation after starting, and can further ameliorate an exhaust gas at an early stage.

Means for Solving the Problems

A first aspect of the present invention, for solving the above problems, is a control apparatus of an engine having an exhaust bypass passage for bypassing a turbine of a supercharger, and a waste gate valve for opening and closing the exhaust bypass passage, the control apparatus comprising: an opening/closing control means for controlling the opening/closing action of the waste gate valve; and a start-up control means for starting up the engine in accordance with an engine start-up request, wherein the opening/closing control means controls the opening/closing action of the waste gate valve in accordance with the temperature of the engine before a start-up procedure for the engine by the start-up control means is started and, if the temperature of the engine is equal to or lower than a first predetermined temperature, controls the waste gate valve in a valve opening direction.

A second aspect of the present invention is the control apparatus of an engine according to the first aspect, wherein the opening/closing control means controls the opening/closing action of the waste gate valve in accordance with the temperature of the engine after the start-up procedure for the engine is completed and, if the temperature of the engine is equal to or lower than a second predetermined temperature, controls the waste gate valve in a valve closing direction.

A third aspect of the present invention is the control apparatus of an engine according to the second aspect, wherein the first predetermined temperature is set to be lower than the second predetermined temperature.

A fourth aspect of the present invention is the control apparatus of an engine according to the third aspect, wherein if the temperature of the engine is equal to or lower than the second predetermined temperature after the start-up procedure for the engine is completed, the opening/closing control means maintains the waste gate valve in a closed state until the temperature of the engine becomes equal to or higher than a third predetermined temperature which is higher than the second predetermined temperature, but lower than the warm-up completion temperature of the engine.

A fifth aspect of the present invention is the control apparatus of an engine according to any one of the first to fourth aspects, wherein the engine has an intake bypass valve for opening and closing an intake bypass passage for bypassing a compressor of the supercharger, and the opening/closing control means controls the opening/closing action of the intake bypass valve as well as the opening/closing action of the waste gate valve and, in controlling the waste gate valve in the valve opening direction, also controls the intake bypass valve in a valve opening direction.

A sixth aspect of the present invention is the control apparatus of an engine according to any one of the first to fifth aspects, wherein the waste gate valve has an actuator which works for valve closing by use of electric power supplied from a battery, and works for valve opening upon a cutoff of the electric power supplied from the battery, and the start-up control means actuates an electric motor for cranking the engine by use of the electric power supplied from the battery.

Effects of the Invention

With the present invention mentioned above, even in extremely cold starting, for example, stable operation of the engine after start-up can be achieved. Moreover, the engine speed by cranking can be increased. Thus, the engine can be started satisfactorily.

MODE FOR CARRYING OUT THE INVENTION

An embodiment of the present invention will now be described in detail by reference to the accompanying drawings.

Figure 1:
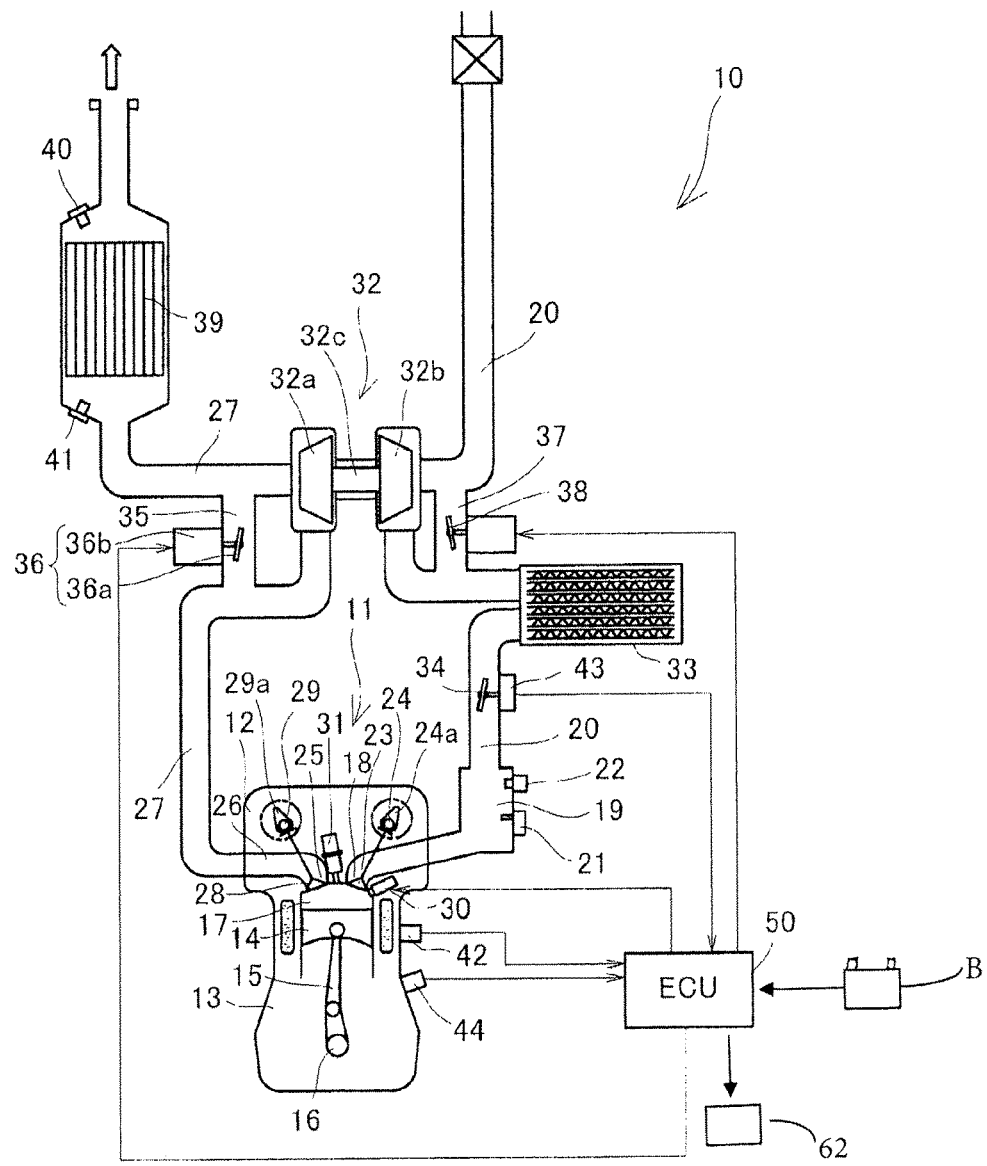
FIG. 1 is a schematic view of an engine equipped with a control apparatus according to an embodiment of the present invention.

First of all, an explanation will be offered for the entire configuration of an engine 10 according to the embodiment of the present invention. As shown in FIG. 1, an engine body 11 constituting the engine 10 has a cylinder head 12 and a cylinder block 13, and a piston 14 is accommodated within the cylinder block 13. The piston 14 is connected to a crankshaft 16 via a connecting rod 15. The piston 14, the cylinder head 12, and the cylinder block 13 form a combustion chamber 17.

An intake port 18 is formed in the cylinder head 12, and an intake pipe (intake passage) 20 including an intake manifold 19 is connected to the intake port 18. The intake pipe 20 is provided with an intake pressure sensor (MAP sensor) 21 for detecting an intake pressure, and an intake temperature sensor 22 for detecting the temperature of intake air. An intake valve 23 is also provided inside the intake port 18, and the intake port 18 is opened and closed with the intake valve 23. That is, the intake valve 23 is adapted to act following an intake cam 24a of an intake camshaft 24 rotating in accordance with an engine revolution, thereby allowing the combustion chamber 17 and the intake port 18 to communicate with each other and to be cut off from each other. Further, an exhaust port 25 is formed in the cylinder head 12, and an exhaust pipe (exhaust passage) 27 including an exhaust manifold 26 is connected to the interior of the exhaust port 25. An exhaust valve 28 is provided in the exhaust port 25 and, as does the intake valve 23 in the intake port 18, the exhaust valve 28 is adapted to act following an exhaust cam 29a of an exhaust camshaft 29, thereby allowing the combustion chamber 17 and the exhaust port 25 to communicate with each other and to be cut off from each other. In the present embodiment, the exhaust port 25 and the exhaust manifold 26 are constituted inside the cylinder head 12. The exhaust manifold 26 is equipped with an exhaust collecting section (not shown), and the exhaust collecting section is connected to a turbine 32a of a turbocharger 32 (to be described later) via an exhaust flange of the cylinder head 12.

Moreover, the engine body 11 is provided with an electric motor (starter motor) 62 for cranking the engine, and a fuel injection valve 30 for injecting fuel into the combustion chamber 17 of each cylinder. The fuel injection valve 30 is supplied with fuel from high pressure fuel delivery piping, although this is not shown. The high pressure fuel delivery piping is supplied with fuel, which has been supplied from a low pressure fuel pump within a fuel tank, while being pressurized to a predetermined pressure by a high pressure fuel pump. The cylinder head 12 is further mounted with a spark plug 31 for each cylinder.

The turbocharger 32, a supercharger, is provided halfway between the intake pipe 20 and the exhaust pipe 27. The turbocharger 32 has the turbine 32a and a compressor 32b, and the turbine 32a and the compressor 32b are coupled together by a turbine shaft 32c. When an exhaust gas flows into the turbocharger 32, the turbine 32a is rotated by the flow of the exhaust gas and, in accordance with the rotation of the turbine 32a, the compressor 32b is rotated. Air (intake air) pressurized by the rotation of the compressor 32b is sent out into the intake pipe 20, and supplied to each intake port 18.

An intercooler 33 is provided at a portion of the intake pipe 20 downstream of the turbocharger 32, and a throttle valve 34 is provided downstream of the intercooler 33. An upstream side and a downstream side of the exhaust pipe 27, with the turbocharger 32 being interposed therebetween, are connected together by an exhaust bypass passage 35. That is, the exhaust bypass passage 35 is a passage for bypassing the turbine 32a of the turbocharger 32. A waste gate valve (WGV) 36 is provided in the exhaust bypass passage 35. The waste gate valve (WGV) 36 is equipped with a valve body 36a, and an electrically operated actuator 36b for driving the valve body 36a, and the amount of the exhaust gas flowing through the exhaust bypass passage 35 can be adjusted depending on the opening of the valve body 36a. That is, the waste gate valve 36 is configured to be capable of adjusting the boost pressure of the turbocharger 32 by adjustment of its opening.

The structure of the waste gate valve 36 may rely on conventional technologies, and may be a structure for maintaining a valve closing state by a spring or the like, for example, as described in JP-A-2006-274831. However, the present embodiment does not use a spring for maintaining the valve closing state, but adopts a structure for maintaining the valve closing state by driving the electric actuator 36b (see JP-A-2012-62803). While the valve closing state is being maintained, therefore, electric power is consumed by the actuator 36b.

An upstream side and a downstream side of the intake pipe 20, with the turbocharger 32 being interposed therebetween, are connected together by an intake bypass passage 37. That is, the intake bypass passage 37 is a passage for bypassing the compressor 32b of the turbocharger 32. In the intake bypass passage 37, an intake bypass valve 38 is provided for opening and closing the intake bypass passage 37. The configuration of the intake bypass valve 38 is not limited, but in the present embodiment, is a configuration equipped with a valve body and an actuator, as is that of the waste gate valve 36.

A three-way catalyst 39, an exhaust gas purification catalyst, is interposed in a portion of the exhaust pipe 27 on the downstream side of the turbocharger 32. An $O_2$ sensor 40 for detecting the $O_2$ concentration of the exhaust gas after passage through the catalyst is provided on the outlet side of the three-way catalyst 39. A linear air-fuel ratio sensor (LAFS) 41 for detecting the air-fuel ratio of the exhaust gas (exhaust air-fuel ratio) before passage through the catalyst is provided on the inlet side of the three-way catalyst 39.

The engine 10 is also equipped with an electronic control unit (ECU) 50, and the ECU 50 is equipped with input/output devices, storage devices for storage of control programs and control maps, a central processing unit, and timers and counters. The ECU 50 exercises the integrated control of the engine 10 based on information from various sensors. The control apparatus of an engine according to the present embodiment is composed of such an ECU 50 and, as will be described below, controls the opening/closing action (opening degree or position) of the waste gate valve 36 in accordance with the operating state of the engine 10 (engine body 11).

Figure 2:
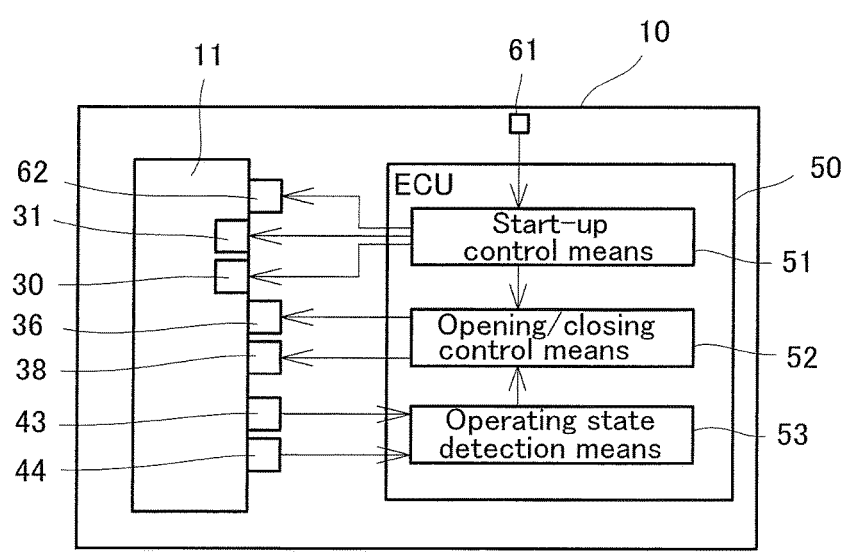
FIG. 2 is a block diagram showing the schematic configuration of the control apparatus according to the embodiment of the present invention.

The control apparatus of an engine according to the present invention is characterized by control over the opening/closing action of the waste gate valve 36 in cold starting of the engine 10. As shown in FIG. 2, the ECU 50 is equipped with a start-up control means 51, an opening/closing control means 52, and an operating state detection means 53.

The start-up control means 51 starts up the engine 10 in accordance with a request from a driver to start up the engine 10. Assume, for example, that a signal requesting the start-up of the engine 10 is outputted by the driver turning on a starting switch 61 such as an ignition switch. In response to this signal, the start-up control means 51 actuates the electric motor (starter motor) 62 of the engine 10 by electric power supplied from a battery B to start cranking, and also adjusts, as appropriate, an ignition timing by the spark plug 31, and the fuel injection amount from and the injection timing of the fuel injection valve 30, for example.

At the request of the driver for start-up of the engine 10, the opening/closing control means 52 controls the opening/closing action of the waste gate valve 36 in accordance with the temperature of the engine 10 before completion of the start-up of the engine 10 by the start-up control means 51. In the present embodiment, before the start-up procedure for the engine 10 by the start-up control means 51 is started, the opening/closing control means 52 controls the opening/closing action of the waste gate valve 36.

Concretely, if the temperature Te of the engine 10 is equal to or lower than a first predetermined temperature Te1, the waste gate valve 36 is brought into an open state. In the present embodiment, if the temperature Te of the engine 10 is higher than the first predetermined temperature Te1, the waste gate valve 36 is brought into a closed state.

As noted above, in a relatively cold starting state, where the temperature Te of the engine 10 is equal to or lower than the first predetermined temperature Te1, or in an extremely cold starting state, the waste gate valve 36 is rendered open. By so doing, the cranking speed can be increased to enhance the startability of the engine 10. That is, by bringing the waste gate valve 36 to an open state, the exhaust resistance of the exhaust gas passing through the turbocharger 32 is decreased. Thus, the cranking speed can be increased to enhance the startability of the engine 10.

Furthermore, the occurrence of such a trouble that the complete explosion of the engine 10 is impossible at the start-up of the engine 10 can be inhibited. Concretely, the actuator 36b of the waste gate valve 36 consumes electric power supplied from the battery during valve closing, as stated earlier. The battery for supplying electric power to the electric motor (starter motor) 62 for cranking of the engine, and the battery for supplying electric power for closing the actuator 36b of the waste gate valve 36 are common. Thus, when the waste gate valve 36 is maintained in a closed state at the start-up of the engine 10, electric power to be supplied for cranking is consumed to reduce the cranking speed, so that the engine 10 may fail to explode completely. When the waste gate valve 36 is placed in an open state at the start-up of the engine 10, by contrast, there is no power consumption by the actuator 36b, and sufficient power can be supplied for cranking. Hence, the occurrence of a trouble, such as incomplete explosion of the engine 10, can be suppressed.

If the temperature Te is higher than the first predetermined temperature Te1, on the other hand, a smooth shift to the open/closed state of the waste gate valve 36 after completion of the start-up of the engine 10 to be described later can be expected. That is, the valve closing state is maintained before the start-up procedure for the engine 10 is started (while the exhaust gas is not flowing), whereby a wasteful closing action of the waste gate valve 36 after completion of start-up can be prevented.

The timing for controlling the opening/closing action of the waste gate valve 36 is preferably prior to the start of the start-up procedure for the engine 10 by the start-up control means 51 as mentioned above, but before the start-up of the engine 10 is completed, may be after the start-up procedure for the engine 10 is started.

After completion of the start-up procedure for the engine 10, the opening/closing control means 52 detects the temperature Te of the engine 10 again. If the temperature Te of the engine 10 is equal to or lower than a second predetermined temperature Te2, the opening/closing control means 52 closes the waste gate valve 36. That is, if the waste gate valve 36 is open, it is closed. If it is closed, it is maintained in a closed state. If the temperature Te is higher than the second predetermined temperature Te2, the opening/closing control means 52 opens the waste gate valve 36. That is, if the waste gate valve 36 is in a closed state, it is brought into an open state. If it is in an open state, its open state is maintained.

When the temperature of the engine 10 is relatively low after completion of the start-up procedure for the engine 10, the waste gate valve 36 is put in a closed state. By so doing, the exhaust resistance rises to increase the inflow (back flow) of the exhaust gas from the combustion chamber 17 toward the intake pipe 20. As a result, fuel and intake air are heated with the heat of the exhaust gas. Thus, even in extremely cold starting, for example, a stable vehicle operation after start-up of the engine 10 can be achieved. Moreover, intense fluidity during the back flow promotes the mixing or atomization of fuel. These effects are marked, particularly, in a configuration having the fuel injection valve in the intake port. Since the exhaust gas at a high temperature remains within the exhaust port, moreover, the warm-up of the engine 10 can be promoted, a rise in the heater water temperature can be induced, and heating performance can also be enhanced. Such effects are marked particularly in a structure having the exhaust manifold and the cylinder head integrated.

In an extremely cold state, the exhaust pipe 27, the turbine 32a, the three-way catalyst 39, the $O_2$ sensor 40, and the linear air-fuel ratio sensor 41 are also in the extremely cold state. It is required, therefore, to heat them for activation to temperatures at which their purification performance is exhibited, or to temperatures at which the sensors work normally. In the extremely cold state, as described above, the exhaust gas is stored inside the cylinder head 12 and warmed with the heat of the engine 10, whereby the exhaust gas can be brought to a high temperature early, the time until the three-way catalyst 39 and the linear air-fuel ratio sensor 41 become active is reduced, and the exhaust gas can be ameliorated early.

The opening/closing control means 52 controls the open/closed state of the waste gate valve 36 after start-up of the engine 10 is completed. A determination of whether the start-up of the engine 10 is completed can be made, for example, based on an operating region (operating state) determined by the speed of and the load on the engine 10. The opening/closing control means 52 also controls the waste gate valve 36 in accordance with the temperature of the engine 10, and a method of detecting the temperature of the engine 10 is not restricted. For example, the engine 10 is provided with a water temperature sensor (temperature detection means) 42 for detecting the temperature of cooling water. The results of detection by the water temperature sensor 42 may be adopted as the temperature of the engine 10, or the temperature of the engine 10 may be estimated from the results of detection by the water temperature sensor 42.

Furthermore, the opening/closing control means 52 controls the opening/closing action of the intake bypass valve 38 along with the waste gate valve 36. In the present embodiment, the opening/closing control means 52, when rendering the waste gate valve 36 open, also brings the intake bypass valve 38 to an open state at the same time. If the temperature Te of the engine 10 before start of the start-up procedure is equal to or lower than the first predetermined temperature Te1, the opening/closing control means 52 opens the waste gate valve 36 as mentioned above, and also opens the intake bypass valve 38. By so doing, the cranking speed can be increased further, and the startability of the engine 10 can be improved further.

The waste gate valve 36 and the intake bypass valve 38 need not be controlled always simultaneously. It suffices, at least, to control the open/closed state of the waste gate valve 36 and, where necessary, to control the open/closed state of the intake bypass valve 38.

The first predetermined temperature Te1 and the second predetermined temperature Te2 may be set, as appropriate, but in the present embodiment, the first predetermined temperature Te1 is set at a lower value than the second predetermined temperature Te2. This is because after completion of the start-up of the engine 10, combustion begins within the combustion chamber (cylinder) 17, so that the temperature (water temperature) Te of the engine 10 rises compared with the value before completion of the start-up. By setting the first predetermined temperature Te1 at a lower value than the second predetermined temperature Te2, moreover, the period for maintaining the valve closed state is finely controlled, whereby power consumption necessary for maintaining the valve in the closed state can be cut down.

The opening/closing control means 52 shifts from the above-described control in the cold state or the extremely cold state to normal control when the temperature Te of the engine 10 reaches a third predetermined temperature Te3 after completion of the start-up of the engine 10. The third predetermined temperature Te3 is a lower value than a warm-up completion temperature. The warm-up completion temperature refers to a temperature corresponding to the valve opening temperature of a thermostat (not shown). If the temperature Te of the engine 10 becomes equal to or higher than the third predetermined temperature Te3, control in extremely cold starting or cold starting is switched to opening/closing control placing a high priority on fuel economy in an ordinary hot state, whereby optimal control for engine performance and fuel economy can be exercised at an early stage.

The operating state detection means 53 detects the operating state of the engine 10, for example, based on information from various sensors such as a throttle position sensor 43 and a crank angle sensor 44. For example, the operating region (operating state) of the engine 10 is specified by detecting the speed of and the load on the engine 10 based on information from the various sensors, and referring to predetermined maps. If, as a result, normal opening/closing control to be described later is executed, for example, the opening/closing control means 52 exercises appropriate control over the open/closed state of the waste gate valve 36 based on the detection results of the operating state detection means 53.

Next, examples of control over the opening/closing action of the waste gate valve in engine start-up will be described by reference to flow charts in FIGS. 3 and 4.

Figure 3:
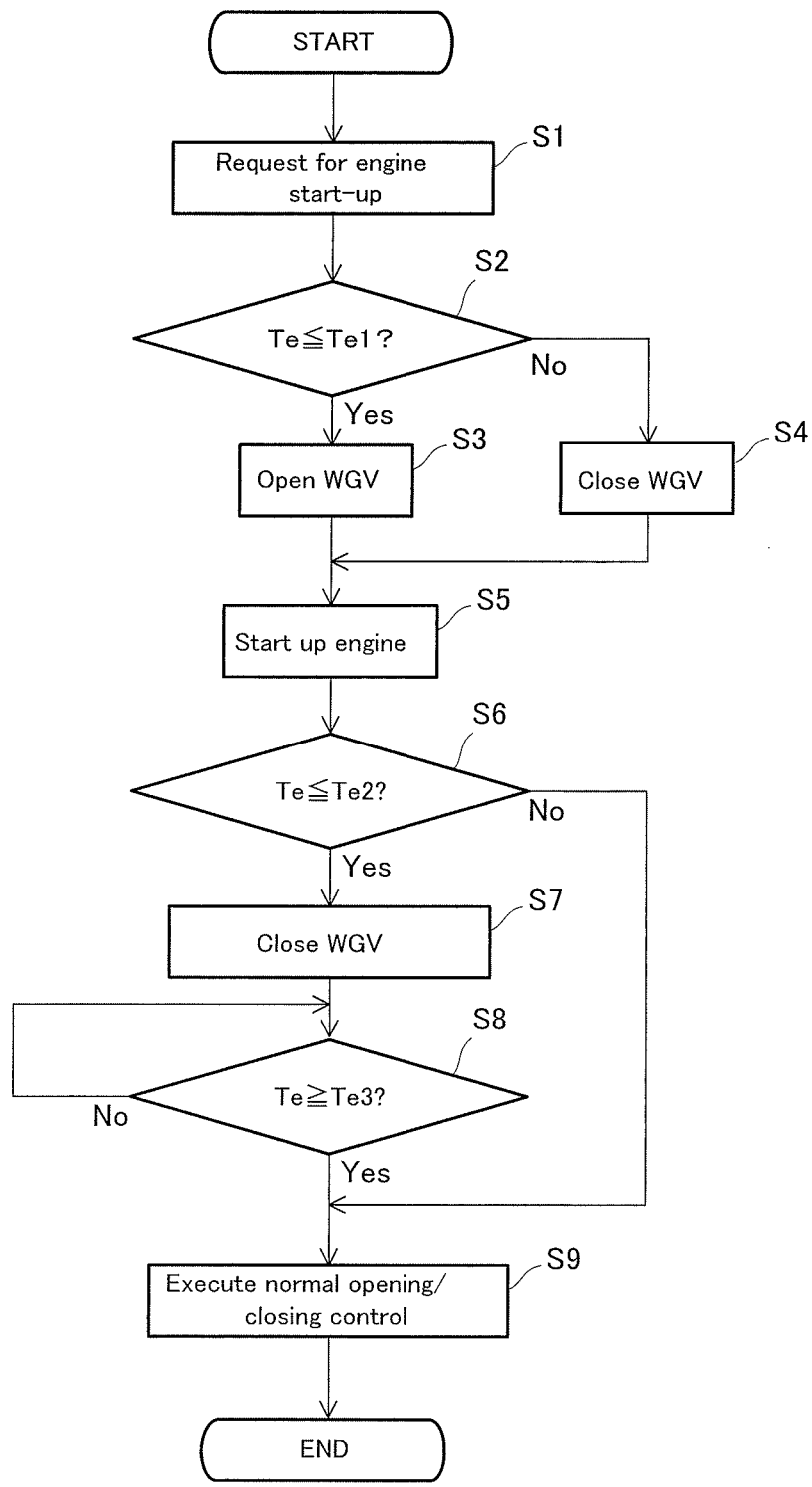
FIG. 3 is a flow chart showing an example of opening/closing control over a waste gate valve according to the embodiment of the present invention.

The flow chart shown in FIG. 3 illustrates an example in which the open/closed state of the waste gate valve 36 is controlled before start of the start-up procedure for the engine 10. In Step S1, a request for start-up of the engine 10 is made by the operation of the starting switch 61 by a driver. In response, the opening/closing control means 52 determines in Step S2 whether the temperature Te of the engine 10 is equal to or lower than the preset first predetermined temperature Te1. If the temperature Te of the engine 10 is equal to or lower than the first predetermined temperature Te1 (Step S2: Yes), the program proceeds to Step S3 in which the opening/closing control means 52 sets the waste gate valve 36 in an open state. For example, if the waste gate valve 36 is in a closed state, the waste gate valve 36 is opened; if it is already in an open state, this state is maintained. If the temperature Te of the engine 10 is higher than the first predetermined temperature Te1 (Step S2: No), on the other hand, the opening/closing control means 52 sets the waste gate valve 36 in a closed state (Step S4). For example, if the waste gate valve 36 is in an open state, the waste gate valve 36 is closed; if it is already in a closed state, this state is maintained.

Then, the program goes to Step S5, in which the start-up control means 51 starts up the engine 10. That is, the start-up control means 51 actuates the electric motor (starter motor) 62 to start cranking. After the start-up procedure for the engine 10 is completed, the program proceeds to Step S6. In Step S6, the opening/closing control means 52 determines whether the temperature Te of the engine 10 is equal to or lower than the preset second predetermined temperature Te2.

If, at this time, the temperature Te of the engine 10 is equal to or lower than the second predetermined temperature Te2 (Step S6: Yes), the opening/closing control means 52 sets the waste gate valve 36 in a closed state (Step S7). That is, if the temperature of the engine 10 is relatively low, warm-up is granted priority and the waste gate valve 36 is closed (Step S7). Then, the opening/closing control means 52 further determines whether the temperature Te of the engine 10 is equal to or higher than the preset third predetermined temperature Te3 (Step S8). The third predetermined temperature Te3 is set at a temperature which is higher than the second predetermined temperature Te2, but lower than the warm-up completion temperature as mentioned earlier. If the temperature Te of the engine 10 is equal to or higher than the third predetermined temperature Te3 (Step S8: Yes), the program proceeds to Step S9, in which the opening/closing control means 52 executes normal opening/closing control. That is, the open/closed state of the waste gate valve 36 is controlled, as appropriate, in accordance with the operating state of the engine 10.

If, in Step S6, the temperature Te of the engine 10 is higher than the second predetermined temperature Te2 (Step S6: No), namely, if the engine 10 is warmed up to some degree, the program proceeds to Step S9 without controlling the waste gate valve 36 in accordance with the temperature of the engine 10, whereupon the opening/control means 52 exercises normal opening/closing control.

Figure 4:
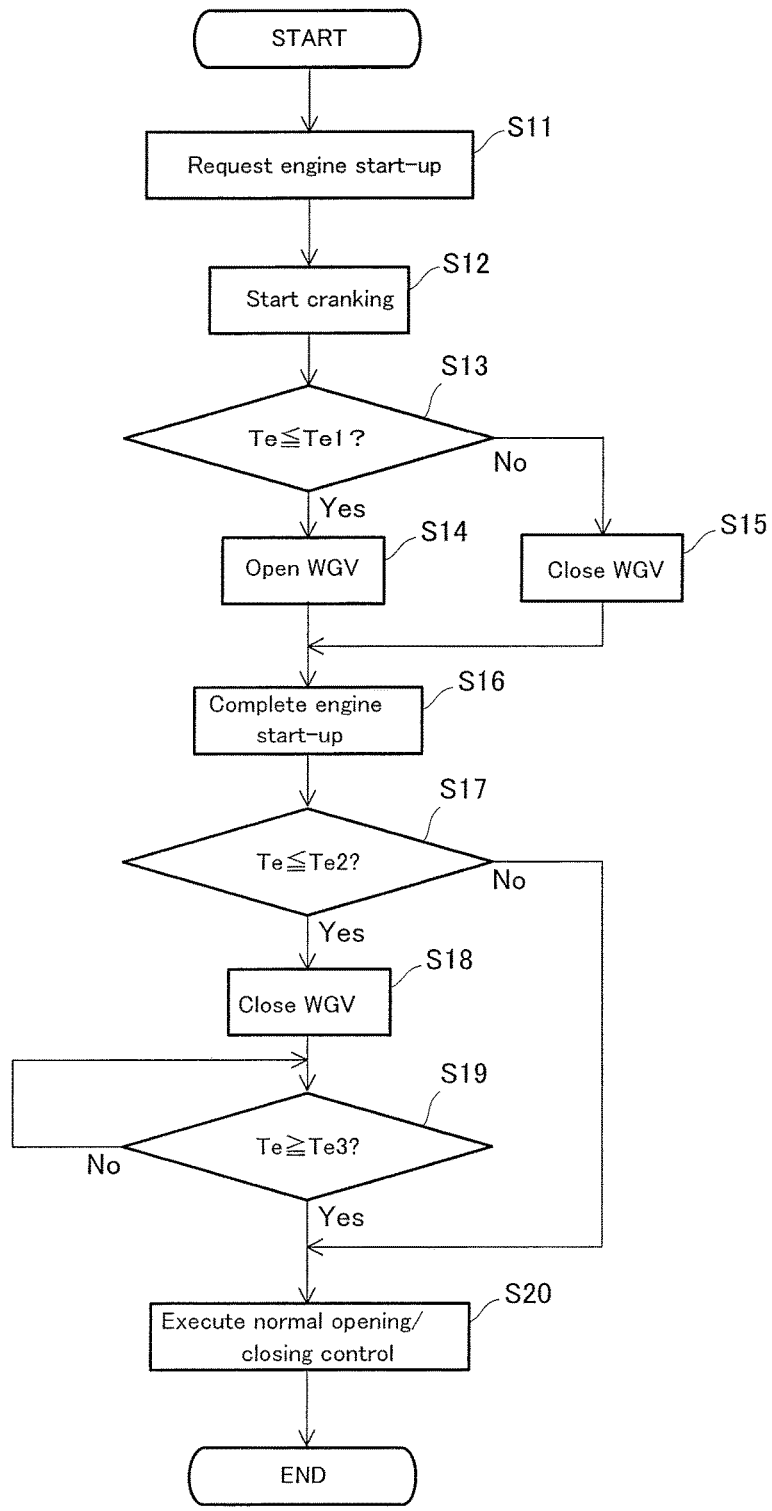
FIG. 4 is a flow chart showing another example of opening/closing control over the waste gate valve according to the embodiment of the present invention.

The flow chart shown in FIG. 4 illustrates an example in which the open/closed state of the waste gate valve 36 is controlled after start of the start-up procedure for the engine 10. In Step S11, a request for start-up of the engine 10 is made by the operation of the starting switch 61 by the driver. In response, the start-up control means 51 actuates the starter motor 62 in Step S12 to start cranking. That is, the start-up procedure for the engine 10 is started. Then, in Step S13, the opening/closing control means 52 determines whether the temperature Te of the engine 10 is equal to or lower than the first predetermined temperature Te1. If, at this time, the temperature Te of the engine 10 is equal to or lower than the first predetermined temperature Te1 (Step S13: Yes), the program proceeds to Step S14, in which the opening/closing control means 52 sets the waste gate valve 36 in an open state (Step S14). If the temperature Te of the engine 10 is higher than the first predetermined temperature Te1 (Step S13: No), on the other hand, the opening/closing control means 52 sets the waste gate valve 36 in a closed state (Step S15). Then, the start-up of the engine 10 is completed in Step S16, whereafter the program goes to Step S17. In this step and subsequent steps, the open/closed state of the waste gate valve 36 is controlled, as appropriate, in accordance with the temperature of the engine 10. Since Steps S17 to S20 are the same as Steps S6 to S9 in the flow chart of FIG. 3, their explanations are omitted here.

With the control apparatus of an engine according to the present embodiment, as described above, the open/closed state of the waste gate valve 36 is controlled, as appropriate, in accordance with the temperature of the engine 10 at start-up. Consequently, even in extremely cold starting, for example, the engine 10 can be started up satisfactorily and, after start-up, stable operation of the engine can be achieved.

Although the embodiment of the present invention has been described above, it is to be noted, needless to say, that the present invention is in no way limited to the foregoing embodiment.

In the above embodiment, for example, after completion of the start-up of the engine 10, it is determined whether the temperature Te of the engine 10 is equal to or lower than the second predetermined temperature Te2. When the temperature Te is higher than the second predetermined temperature Te2, normal opening/closing control is performed. It is permissible, however, to provide a period of time during which the waste gate valve 36 is in an open state, before normal opening/closing control is carried out.

In the above embodiment, moreover, after completion of the start-up of the engine 10, it is determined whether the temperature Te of the engine 10 is equal to or lower than the second predetermined temperature Te2. When the temperature Te is equal to or lower than the second predetermined temperature Te2, the waste gate valve 36 is brought to a closed state. However, it is permissible, for example, to set the waste gate valve 36 once in a closed state, without making a determination as to the temperature of the engine 10, upon completion of the start-up of the engine 10; and to switch to normal opening/closing control at a time when the temperature Te of the engine 10 becomes equal to or higher than a predetermined temperature (third predetermined temperature Te3).

In the above embodiment, moreover, the direct injection type engine which injects fuel into the combustion chamber (into the cylinder) has been illustrated. However, the present invention can be applied to other types of engines, such as a manifold injection type engine which injects fuel into the intake pipe. Besides, only the configuration of the engine has been illustrated in the embodiment, but it goes without saying that the present invention can be applied, for example, to an engine of a hybrid vehicle equipped with an electric motor.

EXPLANATIONS OF LETTERS OR NUMERALS

10 Engine
11 Engine body
12 Cylinder head
13 Cylinder block
14 Piston
15 Connecting rod
16 Crankshaft
17 Combustion chamber
18 Intake port
19 Intake manifold
20 Intake pipe
21 Intake pressure sensor
22 Intake temperature sensor
23 Intake valve
24 Intake camshaft
24a Intake cam
25 Exhaust port
26 Exhaust manifold
27 Exhaust pipe
28 Exhaust valve
29 Exhaust camshaft
29a Exhaust cam
30 Fuel injection valve
31 Spark plug
32 Turbocharger
32a Turbine
32b Compressor
32c Turbine shaft
33 Intercooler
34 Throttle valve
35 Exhaust bypass passage
36 Waste gate valve
37 Intake bypass passage
38 Intake bypass valve
39 Three-way catalyst
40 $O_2$ sensor
41 Linear air-fuel ratio sensor
42 Water temperature sensor
43 Throttle position sensor
44 Crank angle sensor
61 Starting switch
62 Electric motor (starter motor)

The invention claimed is:

1. A control apparatus of an engine having an exhaust bypass passage for bypassing a turbine of a supercharger, a waste gate valve for opening and closing the exhaust bypass passage, a starting switch that outputs an engine start-up request when operated by a driver, and a temperature sensor that detects a temperature of the engine, the control apparatus including a processing device and a storage device storing a program that executes the processing device to:

control an opening/closing action of the waste gate valve via an opening/closing control device of the control apparatus; and start-up the engine in accordance with the engine start-up request via a start-up control device of the control apparatus;

wherein the opening/closing control device controls the opening closing action of the waste gate valve in accordance with the detected temperature of the engine before a start-up procedure for the engine by the start-up control device is started;

wherein if the detected temperature of the engine is equal to or lower than a first predetermined temperature, the opening/closing control device controls the waste gate valve in a valve opening direction; and wherein the opening/closing control device controls the opening/closing action of the waste gate valve in accordance with the detected temperature of the engine after the start-up procedure for the engine is completed;

wherein if the detected temperature of the engine is equal to or lower than a second predetermined temperature, the opening/closing control device controls the waste gate valve in a valve closing direction; and wherein the first predetermined temperature is set to be lower than the second predetermined temperature;

wherein if the detected temperature of the engine is equal to or lower than the second predetermined temperature after the start-up procedure for the engine is completed, the opening/closing control device maintains the waste gate valve in a closed state until the opening/closing control device determines that the detected temperature of the engine becomes equal to or higher than a third predetermined temperature;

wherein the third predetermined temperature is higher than the second predetermined temperature and lower than a warm-up completion temperature of the engine.

2. The control apparatus of an engine according to claim 1, wherein the engine has an intake bypass valve for opening and closing an intake bypass passage for bypassing a compressor of the supercharger; and the opening/closing control device controls an opening/closing action of the intake bypass valve in a valve opening direction as well as the opening/closing action of the waste gate valve in the valve opening direction.

3. The control apparatus of an engine according to claim 2, wherein the waste gate valve has an actuator which operates to close the wastegate valve via an electric power supplied from a battery, and operates to open the wastegate valve upon a cutoff of the electric power supplied from the battery; and wherein the start-up control device actuates an electric motor for cranking the engine via the electric power supplied from the battery.

4. The control apparatus of an engine according to claim 1, wherein the waste gate valve has an actuator which operates to close the wastegate valve via/based on/with respect to an electric power supplied from a battery, and operates to open the wastegate valve upon a cutoff of the electric power supplied from the battery; and wherein the start-up control device actuates an electric motor for cranking the engine via the electric power supplied from the battery.

5. A control apparatus of an engine having an exhaust bypass passage for bypassing a turbine of a supercharger, a waste gate valve for opening and closing the exhaust bypass passage, a starting switch that outputs an engine start-up request when operated by a driver, and a temperature sensor that detects a temperature of the engine, the control apparatus including a processing device and a storage device storing a program that executes the processing device to:

control an opening/closing action of the waste gate valve via an opening/closing control device of the control apparatus; and start-up the engine in accordance with the engine start-up request via a start-up control device of the control apparatus;

wherein the opening/closing control device controls the opening/closing action of the waste gate valve in accordance with the detected temperature of the engine before a start-up procedure for the engine by the start-up control device is started;

wherein if the detected temperature of the engine is equal to or lower than a first predetermined temperature, the opening/closing control device controls the waste gate valve in a valve opening direction;

wherein the first predetermined temperature is set to be lower than the second predetermined temperature;

wherein the engine has an intake bypass valve for opening and closing an intake bypass passage for bypassing a compressor of the super charger; and wherein the opening/closing control device controls an opening/closing action of the intake bypass valve in a valve opening direction as well as the opening/closing action of the waste gate valve in the valve opening direction.

6. The control apparatus of an engine according to claim 5, wherein the waste gate valve has an actuator which operates to close the wastegate valve via an electric power supplied from a battery, and operates to open the wastegate valve upon a cutoff of the electric power supplied from the battery; and wherein the start-up control device actuates an electric motor for cranking the engine via the electric power supplied from the battery.

7. A control apparatus of an engine having an exhaust bypass passage for bypassing a turbine of a supercharger, a waste gate valve for opening and closing the exhaust bypass passage, a starting switch that outputs an engine start-up request when operated by a driver, and a temperature sensor that detects a temperature of the engine, the control apparatus including a processing device and a storage device storing a program that executes the processing device to:

control an opening/closing action of the waste gate valve via an opening/closing control device of the control apparatus; and start-up the engine in accordance with the engine start-up request via a start-up control device of the control apparatus;

wherein the opening/closing control device controls the opening/closing action of the waste gate valve in accordance with the detected temperature of the engine before a start-up procedure for the engine by the start-up control device is started;

wherein if the detected temperature of the engine is equal to or lower than a first predetermined temperature, the opening/closing control device controls the waste gate valve in a valve opening direction;

wherein the waste gate valve has an actuator which operates to close the wastegate valve via/based on/with respect to an electric power supplied from a battery, and operates to open the wastegate valve upon a cutoff of the electric power supplied from the battery; and wherein the start-up control device actuates an electric motor for cranking the engine via the electric power supplied from the battery.

* * * * *